(12) United States Patent
Shen et al.

(10) Patent No.: US 9,755,939 B2
(45) Date of Patent: Sep. 5, 2017

(54) NETWORK WIDE SOURCE GROUP TAG BINDING PROPAGATION

(71) Applicant: CISCO TECHNOLOGY, INC., San Jose, CA (US)

(72) Inventors: Naiming Shen, Santa Clara, CA (US); Jun Zhuang, Palo Alto, CA (US); Enke Chen, San Jose, CA (US); Michael Lee Sullenberger, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 99 days.

(21) Appl. No.: 14/751,503

(22) Filed: Jun. 26, 2015

(65) Prior Publication Data
US 2016/0380864 A1    Dec. 29, 2016

(51) Int. Cl.
*H04L 12/26* (2006.01)
*H04L 29/08* (2006.01)
*H04L 29/06* (2006.01)

(52) U.S. Cl.
CPC .......... *H04L 43/10* (2013.01); *H04L 63/0227* (2013.01); *H04L 67/22* (2013.01)

(58) Field of Classification Search
None
See application file for complete search history.

(56) References Cited

U.S. PATENT DOCUMENTS

| | | | |
|---|---|---|---|
| 7,710,900 B2 * | 5/2010 | Andrews | H04L 12/66 370/254 |
| 7,986,689 B2 | 7/2011 | Shen et al. | |
| 8,769,091 B2 | 7/2014 | White et al. | |
| 2009/0217355 A1 * | 8/2009 | Smith | G06F 21/6218 726/3 |
| 2009/0300350 A1 * | 12/2009 | Gai | H04L 12/4645 713/160 |

OTHER PUBLICATIONS

IETF Internet Draft "Traceroute and Ping Message Extension", drfat-shen-traceroute-ping-ext-04, N. Shen et al., Feb. 27, 2012.
IETF RFC 4443, "Extended ICMP to Support Multi-Part Messages", R. Bonica et al., Apr. 2007.
IETF Internet Draft, "Source-Group Tag eXchange Protocol (SXP)", drfat-smil-kandula-exp-02, M. Smith et al., Feb. 6, 2015.

* cited by examiner

*Primary Examiner* — Anh Ngoc Nguyen
(74) *Attorney, Agent, or Firm* — Cindy Kaplan

(57) ABSTRACT

In one embodiment, a method includes generating at a network device, a trace packet comprising an IP (Internet Protocol) to Source Group Tag (SGT) binding, transmitting the trace packet from the network device to an SGT capable device, wherein at least one non-SGT capable device is interposed in a path between the network device and the SGT capable device, and receiving at the network device, a reply packet from the SGT capable device in response to the trace packet, the reply packet indicating that the IP to SGT binding was installed at the SGT capable device. An apparatus and logic are also disclosed herein.

23 Claims, 9 Drawing Sheets

IPv4 prefix list to SGT binding Object

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|             Length            |   Class-Num   |    C-Type     |
+-+-+-+-+-+-+-+-+-+-+-+-+-+-+-+-+-+-+-+-+-+-+-+-+-+-+-+-+-+-+-+-+
|                        Sequence Number                        |
+-+-+-+-+-+-+-+-+-+-+-+-+-+-+-+-+-+-+-+-+-+-+-+-+-+-+-+-+-+-+-+-+
|           SGT value           |   OP  |    Number of prefixes |
+-+-+-+-+-+-+-+-+-+-+-+-+-+-+-+-+-+-+-+-+-+-+-+-+-+-+-+-+-+-+-+-+
.                        IPv4 Prefix list                       .
.                             ....                              .
+-+-+-+-+-+-+-+-+-+-+-+-+-+-+-+-+-+-+-+-+-+-+-+-+-+-+-+-+-+-+-+-+
```

NETWORK WIDE SOURCE GROUP TAG BINDING PROPAGATION

TECHNICAL FIELD

The present disclosure relates generally to communications networks, and more particularly, to Source Group Tags (SGTs).

BACKGROUND

Source groups are endpoints connecting to the network that have common network policies. Each source group is identified by a unique SGT value. The SGT to which an endpoint belongs can be assigned statically or dynamically, and the SGT may be used as a classifier in network policies.

BRIEF DESCRIPTION OF THE DRAWINGS

FIG. 7 illustrates an example of a prefix list to source group tag binding object for use in the source group tag propagation trace with IPv4, in accordance with one embodiment.

Corresponding reference characters indicate corresponding parts throughout the several views of the drawings.

DESCRIPTION OF EXAMPLE EMBODIMENTS

Overview

Figure 1:
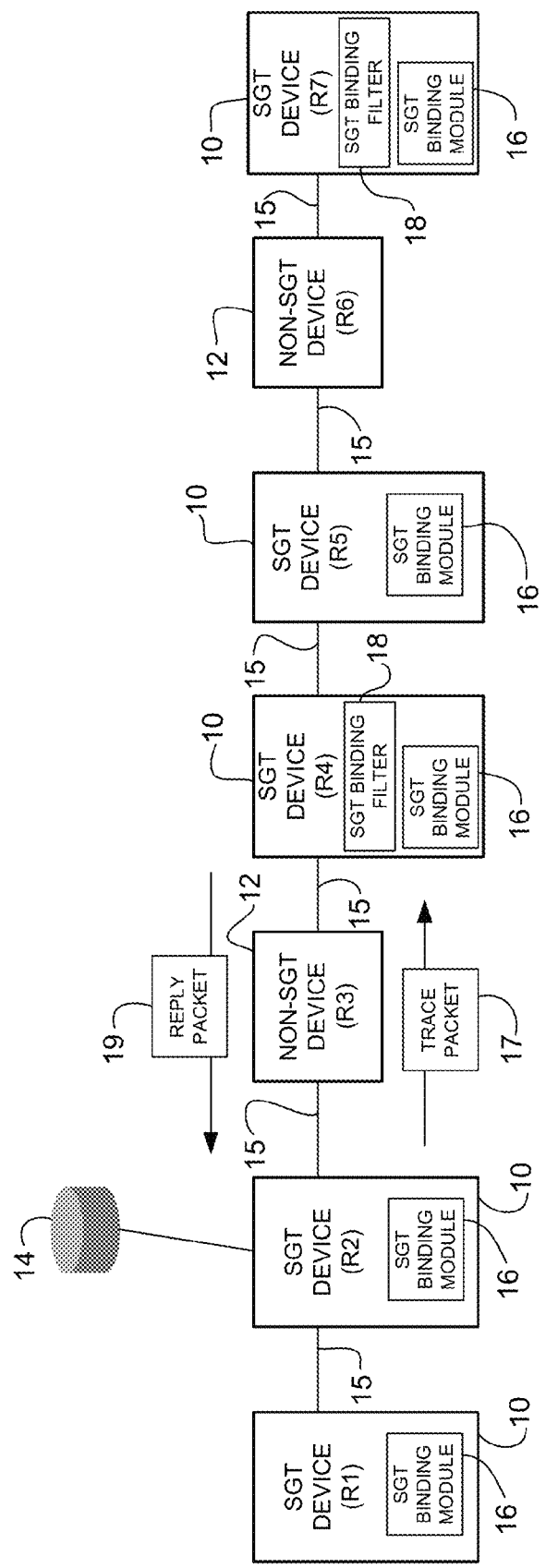
FIG. 1 illustrates an example of a network in which embodiments described herein may be implemented.

In one embodiment, a method generally comprises generating at a network device, a trace packet comprising an IP (Internet Protocol) to Source Group Tag (SGT) binding, transmitting the trace packet from the network device to an SGT capable device, wherein at least one non-SGT capable device is interposed in a path between the network device and the SGT capable device, and receiving at the network device, a reply packet from the SGT capable device in response to the trace packet, the reply packet indicating that the IP to SGT binding was installed at the SGT capable device.

In another embodiment, a method generally comprises receiving a trace packet comprising an IP to SGT binding at an SGT capable device, the packet received from a non-SGT capable device interposed between a sender of the trace packet and the SGT capable device, installing a filter based on said IP to SGT binding at the SGT capable device, generating a reply packet in response to the trace packet, the reply packet indicating that said IP to SGT binding was installed at the SGT capable device, and transmitting the reply packet to the sender.

In yet another embodiment, an apparatus generally comprises an interface for communication with an SGT capable device via one or more non-SGT capable network devices, a processor for generating a trace packet comprising an IP to SGT binding, transmitting the trace packet to the SGT capable device, and processing a reply packet received from the SGT capable device in response to the trace packet, the reply packet indicating that said IP to SGT binding was installed at the SGT capable device. The apparatus further comprises memory for storing the IP to SGT binding.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Source Group Tag (SGT) is maintained by tagging packets on ingress to the network so that they can be properly identified for the purpose of applying security and other policy along the data path. SGT allows the network to enforce policies by enabling the endpoint device to act upon the SGT. An endpoint's SGT along with its IP (Internet Protocol) address (referred to as an IP to SGT (IP-SGT) binding) needs to be transported from one SGT-aware network device to another SGT-aware network device. SXP (Source Group Tag (SGT) Exchange Protocol) is an example of a control plane mechanism that may be used to transport IP-SGT bindings. Each SXP connection has one peer designated as an SXP speaker and the other peer as an SXP listener. The SXP speaker sends IP to SGT bindings over SXP connections and the listener receives the bindings.

In a network wide SGT scheme working across two SGT-aware islands, an SXP speaker may launch a TCP (Transmission Control Protocol) session directed towards the SXP listener to pass the IP to SGT binding so that the remote SXP device can setup a filter for future data packets that are identified by the SXP message to add back the SGT information on the data packet of the flow bypassing a non-SGT-aware portion of the network. However, this approach has a number of drawbacks. First, the SXP protocol is very complex. More importantly, the protocol assumes that the SXP speaker knows where to launch the SXP session to the listener or listeners. This requires knowledge of the location of the boundary of non-SGT-aware island and SGT-aware island, which may be difficult to achieve in a general network topology. Furthermore, SXP only handles the case where there is one non-SGT-aware cloud in the network.

The embodiments described herein utilize a route tracing mechanism to dynamically propagate IP to SGT bindings to remote devices that are SGT-aware without special protocol and without static knowledge of where those remote devices are located. The embodiments may be used, for example, to transport an endpoint's SGT along with IP information (e.g., IP address, IP prefix, IP flow) from one SGT-aware network device to another SGT-aware network device in a traceroute packet.

It is to be understood that the term "source group tag" or "SGT" as used herein may refer to any type of identifier or value used to identify endpoints that have common network policies or as a classifier for network policies.

Referring now to the drawings, and first to FIG. 1, a network in which embodiments described herein may be implemented is shown. The embodiments operate in the context of a data communication network including multiple network devices. For simplification, only a small number of nodes are shown. The network may include any number of network devices in communication via any number of nodes (e.g., routers, switches, controllers, gateways, access layer devices, aggregation layer devices, edge devices, core devices, or other network devices), which facilitate passage of data within the network.

The network shown in the example of FIG. 1 includes a plurality of network devices 10, 12 (e.g., routers R1, R2, R3, R4, R5, R6, R7) connected by links 15. The routers 10, 12 may be located in one or more networks and there may be any number of network devices interposed between the nodes shown in FIG. 1. The term 'router' as used herein may refer to any network device (e.g., router, switch/router) configured to perform routing functions. In the example shown in FIG. 1, network devices R1, R2, R4, R5, and R7 are SGT-aware (SGT capable) devices (i.e., capable of performing a source group tag process) and network devices R3 and R6 are non-SGT-aware (non-SGT capable) devices (i.e., not capable of performing a source group tag process). The network devices 10, 12 may be located in different islands (e.g., domains, networks, SGT-aware islands, non-SGT-aware islands). For example, network devices R1 and R2 may be located in one SGT island, network devices R4 and R5 may be located in another SGT island, and network device R7 located in yet another SGT island. Network devices R3 and R6 are each located in a non-SGT-aware island. Each island may include any number of network devices.

One or more of the SGT devices 10 may communicate with SGT binding database 14. The binding database 14 may be located in the same network as the network device 10 or in the cloud, for example. The SGT binding database may also comprise a mapping table that may be statically provisioned on one or more SGT network devices 10. In one example, an edge router or border router (e.g., R1) stores a site prefix and SGT assignment.

An IP device at the source of IP information (e.g., IP address, IP prefix, or IP flow) may need to check that an IP packet with an SGT can be installed and carried throughout the entire network path, but may not know details of the SGT-aware islands and non-SGT aware islands. In one or more embodiments, the network device 10 uses a trace packet 17 comprising the IP-SGT binding in the payload to trigger any SGT-aware devices at the SGT island boundary locations to install binding filters according to the binding in the trace packet. The SGT propagation trace may be implemented without static knowledge of where remote SGT devices are located or details of SGT and non-SGT islands. The sender of the trace packet 17 may be any SGT-aware device 10 in the network.

As described below, one or more embodiments may be data driven without any static provisioning to allow SGT policies to be applied to packets through an entire network for the SGT-aware devices. For example, an edge or border router may know its site prefix and SGT assignment and can send out the trace packet 17 towards certain destinations and cover the SGT-aware devices of another island. One or more embodiments may be control plane based and use the database 14 for cloud provisioning. For example, the SGT device R2 originating the trace packet 17 may consult the SGT binding database 14 in the cloud or a mapping table statically provisioned at the SGT-aware device R2 or other SGT-aware device.

In certain embodiments, one or more network devices 10 include an SGT binding propagation module 16 operable to generate and transmit trace packet 17 for network wide propagation of IP-SGT bindings. The SGT binding module 16 at a receiving SGT device 10 is operable to install a filter 18 based on the IP-SGT binding received in the trace packet 17 and transmit a reply packet 19 indicating successful installation of the binding. As shown in FIG. 1, for example, SGT device R2 (sender) may generate and transmit trace packet 17 comprising an IP to SGT binding list to SGT device R4 (responder, receiver). The trace packet 17 is forwarded by non-SGT device R3 to SGT device R4, which installs SGT binding filter 18 according to the received IP to SGT binding. In response to the trace packet 17, SGT device R4 transmits reply packet 19 indicating successful installation of the SGT binding.

The SGT binding filter 18 only needs to be installed at SGT devices located at a boundary between an SGT island and non-SGT island (e.g., SGT capable devices R4 and R7 in FIG. 1). Since SGT device R5 knows that its upstream neighbor R4 is also an SGT capable device, it does not need to install the filter. The SGT devices setup the filter 18 for future data packets to add back the SGT information on the data packet of flow bypassing the non-SGT aware part of the network. The remote installed SGT binding filter 18 preferably has a timeout in case traffic is no longer being sent on this path or due to certain routing changes. The sender may refresh the trace packets 17 to regenerate the filter on nodes at remote islands.

The SGT binding propagation trace process may be performed at any of the SGT devices 10, which may operate as a sender or responder for the SGT binding propagation trace. For example, SGT device R5 may operate as a sender and transmit a trace packet 17 to SGT device R7 (responder).

It may be noted that packets tagged with SGT may change the forwarding of the packet through the SGT capable network. The trace packet 17 is not SGT tagged, since it is traversing (has traversed) a non-SGT capable portion of the network (e.g., non-SGT device 12). Therefore, the trace packet 17 would follow the same path through the non-SGT capable portion of the network as the data flow packet, but may not follow the same path as the data flow packet through the next SGT capable portion of the network. Thus, a new trace packet 17 is preferably generated for each non-SGT island and inserted at the boundary for that island (e.g., SGT device R5 in FIG. 1). One or more embodiments may therefore automatically generate a new trace packet 17 at each SGT to non-SGT capable island edge to cover multiple non-SGT capable islands.

As described in detail below, a traceroute process may be used to dynamically propagate a list of IP-SGT bindings to remote islands without the need for an SGT exchange protocol or static knowledge of where those remote devices are located. Traceroute is an example of a tool that may be used to trace the route of a packet over each hop from a client to a remote node. The traceroute protocol sends a series of trace packets (probe packets) to an IP address and awaits an ICMP (Internet Control Message Protocol) reply. It is to be understood that the term "trace" or "traceroute" as used herein may refer to a traceroute or ping protocol or any other route or path tracing mechanism operable to transmit trace messages and receive reply messages.

As described further below, one or more embodiments may utilize a traceroute object extension as described in IETF (Internet Engineering Task Force) Internet-Draft "Traceroute and Ping Mechanism Extension", N. Shen et al., Feb. 27, 2012 (draft-shen-traceroute-ping-ext-04) to transmit the IP-SGT bindings in the trace packet 17. One or more embodiments may utilize an ICMP multi-part message as described in IETF RFC (Request for Comments) 4884 "Extended ICMP to Support Multi-Part Messages", R. Bonica et al., April 2007, to reply to the trace message and identify successful installation of SGT filter 18 in reply packet 19. The trace protocols and packet formats described herein are only examples and other protocols or packets may be used to implement the embodiments described herein.

It is to be understood that the network shown in FIG. 1 is only an example and the embodiments described herein may be implemented in networks comprising different network topologies or network devices, or using different network protocols, without departing from the scope of the embodiments. For example, the network may include any number of SGT or non-SGT network devices and SGT-aware islands or non-SGT-aware islands arranged in any topology. The example shown in FIG. 1 illustrates one network path, but the network may include any number of network paths passing through any number of SGT/non-SGT devices or islands. For example, each SGT device 10 may be located in any number of network paths and may have more than one SGT filter 18 installed thereon. Furthermore, the IP-SGT binding is only an example of information that may be propagated using the embodiments described herein. For example, the embodiments described herein may use traceroute packets to propagate other types of bindings or mappings.

Figure 2:
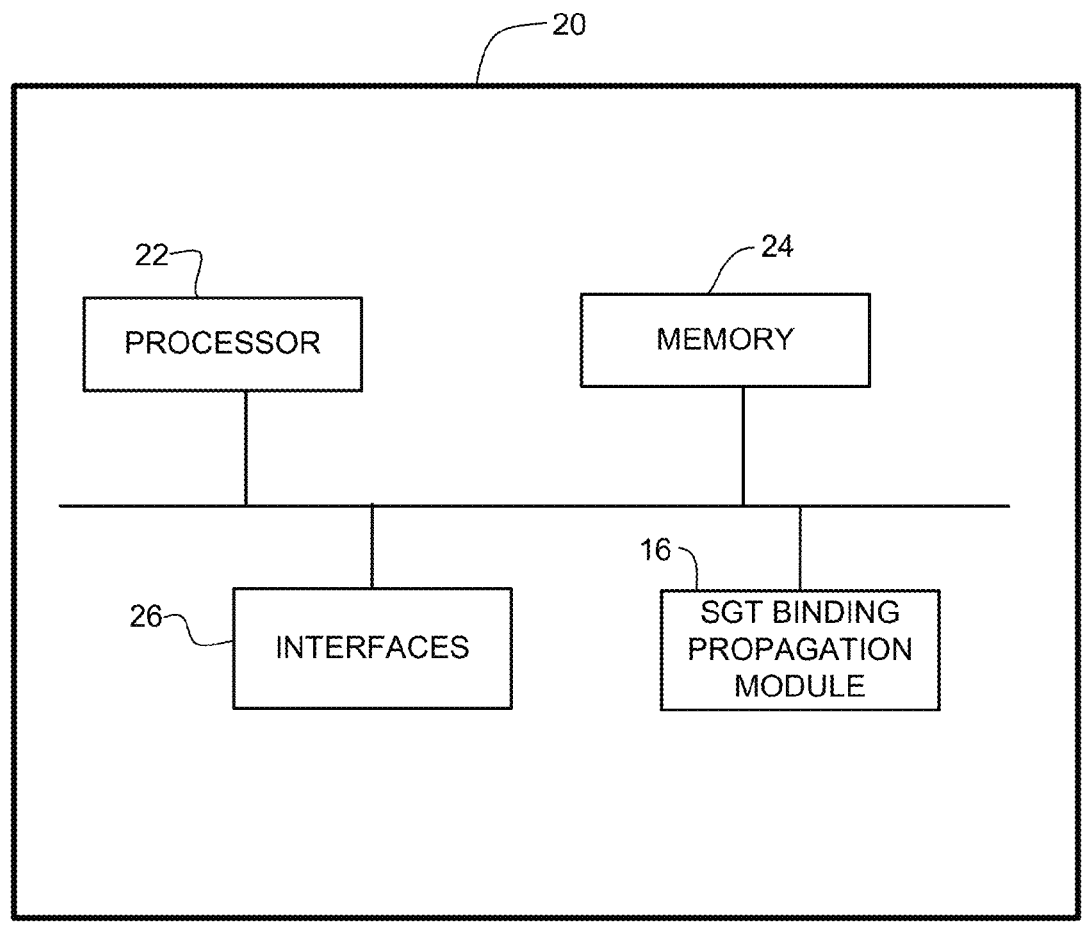
FIG. 2 depicts an example of a network device useful in implementing embodiments described herein.

FIG. 2 illustrates an example of a network device 20 (e.g., router 10 in FIG. 1) that may be used to implement the embodiments described herein. In one embodiment, the network device 20 is a programmable machine that may be implemented in hardware, software, or any combination thereof. The network device 20 includes one or more processor 22, memory 24, network interfaces 26, and SGT binding propagation module 16.

Memory 24 may be a volatile memory or non-volatile storage, which stores various applications, operating systems, modules, and data for execution and use by the processor 22. For example, components of SGT binding propagation module 16 (e.g., code, logic, software, firmware, etc.) may be stored in memory 24. Memory 24 may also store a mapping table comprising IP-SGT bindings and the SGT binding filter 18 (FIG. 1).

Logic may be encoded in one or more tangible media for execution by the processor 22. For example, the processor 22 may execute codes stored in a computer-readable medium such as memory 24. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In certain embodiments, logic may be encoded in non-transitory computer-readable media.

The network interfaces 26 may comprise any number of interfaces (linecards, ports) for receiving data or transmitting data to other devices. For example, as shown in FIG. 1, the routers 10 may comprise interfaces for transmitting trace packets 17, reply packets 19, SGT data packets, or receiving trace packets, reply packets, or SGT data packets on a network path. The network interface 26 may include, for example, an Ethernet interface for connection to a computer or network. The network interfaces 26 may be configured to transmit or receive data using a variety of different communication protocols. The interfaces 26 may include mechanical, electrical, and signaling circuitry for communicating data over physical links coupled to the network.

It is to be understood that the network device 20 shown in FIG. 2 and described above is only an example and that different configurations of network devices may be used. The network device 20 may further include any suitable combination of hardware, software, algorithms, processors, devices, components, or elements operable to facilitate the capabilities described herein.

Figure 3:
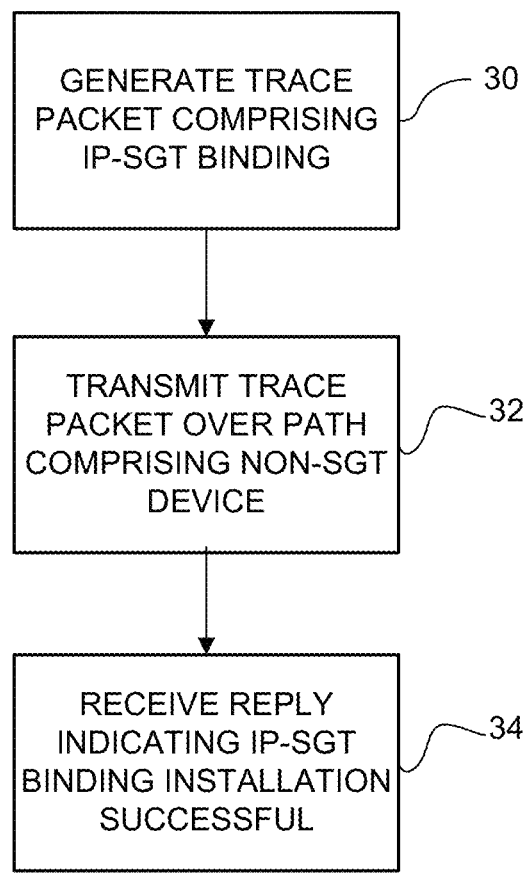
FIG. 3 is a flowchart illustrating an overview of a process for source group tag binding propagation at a sender, in accordance with one embodiment.

FIG. 3 is a flowchart illustrating an overview of a process for source group tag binding propagation at a sender node, in accordance with one embodiment. At step 30, a network device (e.g., sender R2 in FIG. 1) generates a trace packet 17 comprising an IP to SGT binding (IP-SGT binding). The IP information in the binding may comprise, for example, an IP address, IP prefix, or IP flow. The network device R2 transmits the trace packet 17 to an SGT capable device (R4) over a path comprising at least one non-SGT capable device (R3) (step 32). Once an SGT filter 18 has been installed at the receiver (R4) for the IP-SGT binding, the sender node R2 receives a reply packet 19 indicating that the SGT binding installation was successful (step 34).

Figure 4:
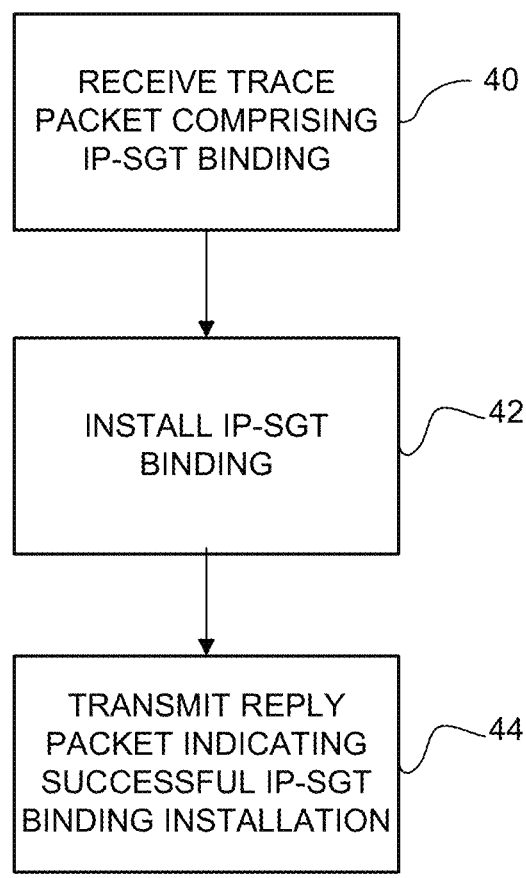
FIG. 4 is a flowchart illustrating an overview of a process for source group tag binding installation at a responder, in accordance with one embodiment.

FIG. 4 is a flowchart illustrating an overview of a process for source group tag binding installation at a receiver node, in accordance with one embodiment. At step 40, a network device (e.g., responder R4 in FIG. 1) receives a trace packet 17 comprising an IP to SGT binding. The trace packet 17 was transmitted from a sender (R2) over a network path comprising at least one non-SGT capable device (R3). Once SGT binding filter 18 has been installed at responder R4 based on the IP-SGT binding (step 42), the SGT capable device generates and transmits a reply packet 19 indicating that the IP-SGT binding installation was successful (step 44).

It is to be understood that the processes shown in FIGS. 3 and 4, and described above are only examples and steps may be added, modified, reordered, or combined, without departing from the scope of the embodiments.

Figure 5:
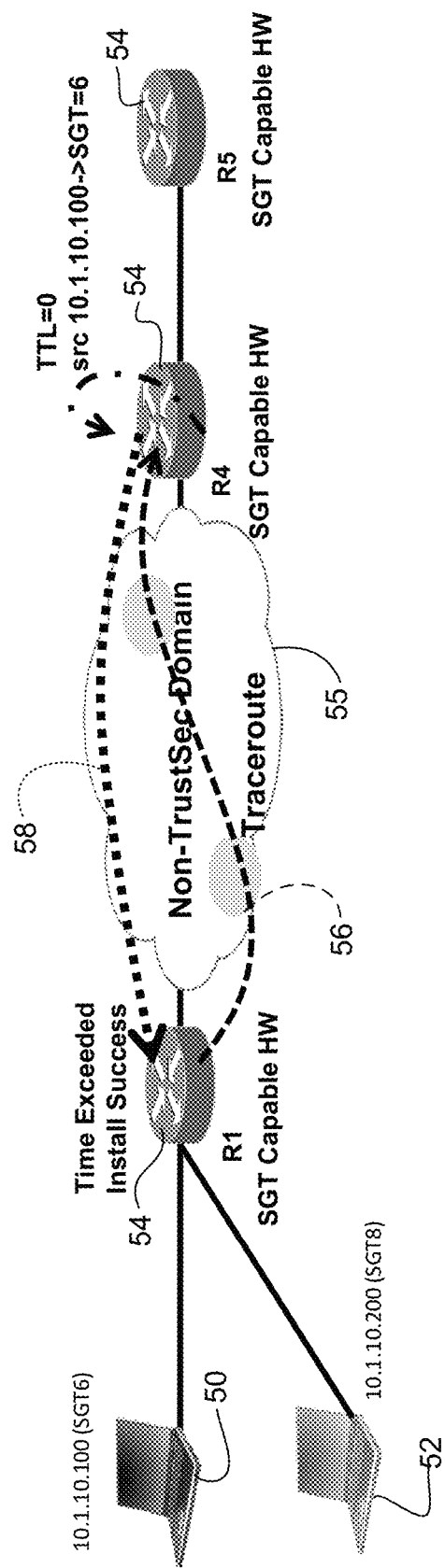
FIG. 5 illustrates an example of a source group tag propagation trace, in accordance with one embodiment.

FIG. 5 illustrates an example of an SGT propagation trace in accordance with one embodiment. The network includes two endpoints (users, hosts) 50, 52 in communication with a plurality of network devices 54 (R1, R4, R5). Endpoint 50 has an IP address of 10.1.10.100, which is mapped to SGT6. Endpoint 52 has an IP address of 10.1.10.200, which is mapped to SGT8. Both endpoints 50, 52 are in communication with an SGT capable device (router R1). Router R1 is in communication with router R4 via a non-TrustSec domain 55, which comprises any number of non-SGT capable devices. Router R4 is in communication with router R5, which is also an SGT capable device. Network device R1 (sender) generates a trace packet (e.g., trace packet 17 in FIG. 1) to install the IP to SGT binding at router R4. When router R4 receives the trace packet on path 56 with TTL (time-to-live) expired (equal to zero), it installs the binding from the trace packet (src 10.1.10.100→SGT=6). SGT device R4 transmits a reply packet (reply packet 19 in FIG. 1) on path 58 to sender R1 indicating that the filter has been successfully installed.

Figure 6:
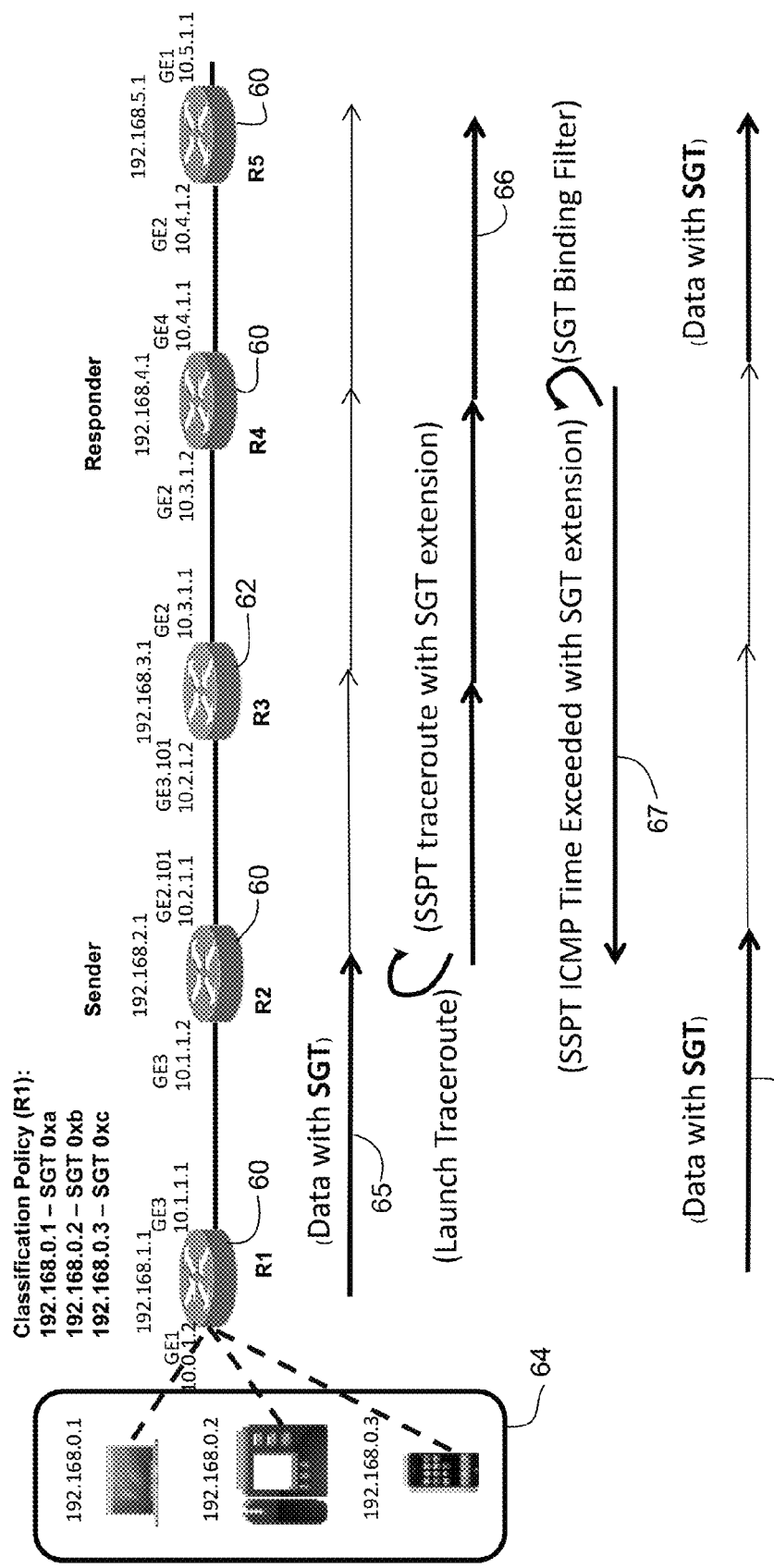
FIG. 6 illustrates an example of a process flow for the source group tag propagation trace, in accordance with one embodiment.

FIG. 6 illustrates an example of a process flow for seamless SGT propagation trace (SSPT), in accordance with one embodiment. In the example shown in FIG. 6, a plurality of endpoints 64 (e.g., computer, IP phone, mobile phone) are in communication with a plurality of network devices 60, 62. Network devices 60 (R1, R2, R4, and R5) are SGT capable devices and network device 62 (R3) is a non-SGT capable device. Network device R1 has a classification policy comprising IP address to SGT bindings as follows:

192.168.0.1—SGT 0xa
192.168.0.2—SGT 0xb
192.168.0.3—SGT 0xc

The IP addresses listed above are assigned to the endpoints 64.

Network device R1 sends data with SGT (as indicated at flow 65) to network device R2, which is also SGT capable. Since an IP-SGT binding has not yet been installed at the downstream nodes due to the interposed non-SGT capable node R3, the classification policy cannot be applied at the downstream nodes R4, R5. Network device R2 (sender) knows that downstream node R3 is not SGT capable and therefore launches an SGT propagation trace (e.g., traceroute with SGT extension) to transmit the IP-SGT binding (flow 66). Network device R3 forwards the traceroute packet to network device R4. Network device R4 (responder) processes the traceroute packet and installs the SGT binding filter. After installing the filter, network device R4 responds with a reply message (e.g., ICMP Time Exceeded with SGT extension) indicating successful installation of the filter (flow 67). Data transmitted with a source group tag can now be transmitted with the classification policy applied at downstream nodes R4, R5 (flow 68).

In one embodiment, upon receiving the traceroute packet 17 with TTL (time-to-live) expired, the SGT compatible device R4 checks to see if the traceroute extension payload is an SGT binding TLV (type-length-value). As described below, the receiver may perform an authentication TLV check. If the inbound interface protocol (e.g., CDP (Cisco Discovery Protocol) exchange) does not recognize the neighbor as an SGT-aware device it may be at the boundary of an SGT-aware island. If the SGT binding object exists, the device R4 may install a filter for the IP to SGT binding to apply to data packets later received. The receiver R4 preferably sends a reply packet (e.g., ICMP reply packet) back to the sender R2, which indicates that the SGT binding was installed. In one embodiment, the SGT binding installed notification is provided in a Time Exceeded type of an ICMP multi-part message. The sender R2 may remember this feedback so that the next update of SGT binding can set the proper TTL value (e.g., it does not need to start with one).

Authentication may be provided as described in IETF Internet-Draft "Traceroute and Ping Message Extension" (referenced above) to offer security. For example, the traceroute message may include an authentication signature object. The intermediate and destination nodes may authenticate the sender of the traceroute packet 17 before providing the requested information in the ICMP response 19.

As noted above, the originating router may use a control plane based process with cloud database oriented provisioning or a data plane based process without centralized provisioning.

In the data plane based process, the router receives an SGT tagged IP packet and the next hop device is known not to support SGT. In one example, the router may punt to the control plane SGT propagation process, glean the SGT value and 5 tuple (or source IP address) of the IP packet, format the traceroute packet 17 with this SGT propagation extension, and send the packet out towards the IP destination of the original IP packet. The SGT propagation process preferably installs a filter for this IP flow to indicate that there is no need to continue punting the packet in the flow to the control plane. The flow filter may timeout after a specified period of time without data traffic passing therethrough. This mechanism is dynamic and there is no static provisioning (i.e., no information on either the IP to SGT binding or the remote SGT-aware device to install the filter) as may be needed by an exchange protocol.

In the control plane process for SGT propagation, the sender may consult a local or remote database (e.g., binding database 14 in FIG. 1) for the definition of the IP to SGT mappings. The database provisioning may define the originating routers that will launch the traceroute packets 17. The database 14 may also define the remote IP destinations to which traceroute sends packets.

In one embodiment a traceroute extension is used to dynamically propagate a list of IP prefixes to SGT binding information. The traceroute extension may be, for example, as described in IETF Internet-Draft "Traceroute and Ping Message Extension". The traceroute extension mechanism may be used to encode a list of IP addresses, IP prefixes, IP flows (e.g., 5-tuple information), or any combination of these or other identifiers, to the SGT binding in the payload of the traceroute packet 17.

The following is an example of a traceroute packet format for an SGT propagation trace:

| IP | UDP | Offset | Ext | Mapping: 10.1.10.100 −> SGT 6 |
|---|---|---|---|---|

The mapping field in the above example provides the IP to SGT binding for endpoint 50 in FIG. 5.

FIG. 7 illustrates an example of an IPv4 prefix list to SGT binding object 70. The Length may be, for example, a variable in octets and padded to a multiple of 32 bits for the object. The Class-Num may be, for example, an IANA allocation from ICMP Trace-Ping extension registry. The C-Type may be 1. The Sequence Number may be a 32 bit number representing the binding for a specific list of IP addresses to SGT. The SGT value may be a 16 bit number. The OP (option) may be 3 bits. Defined values include: 1—Filter Install; and 2—Filter Remove. The number of prefixes may be a 13 bit value corresponding to a total number of prefix lists. The IPv4 prefix list may contain a list of multiple of 5 octets data; where the first four octets are the IPv4 prefix and the $5^{th}$ octet is the prefix length. The SGT value, OP, Number of prefixes, and Prefix list may be repeated multiple times to fit into a UDP (User Datagram Protocol) packet not exceeding the MTU (Maximum Transmission Unit).

Figure 8:
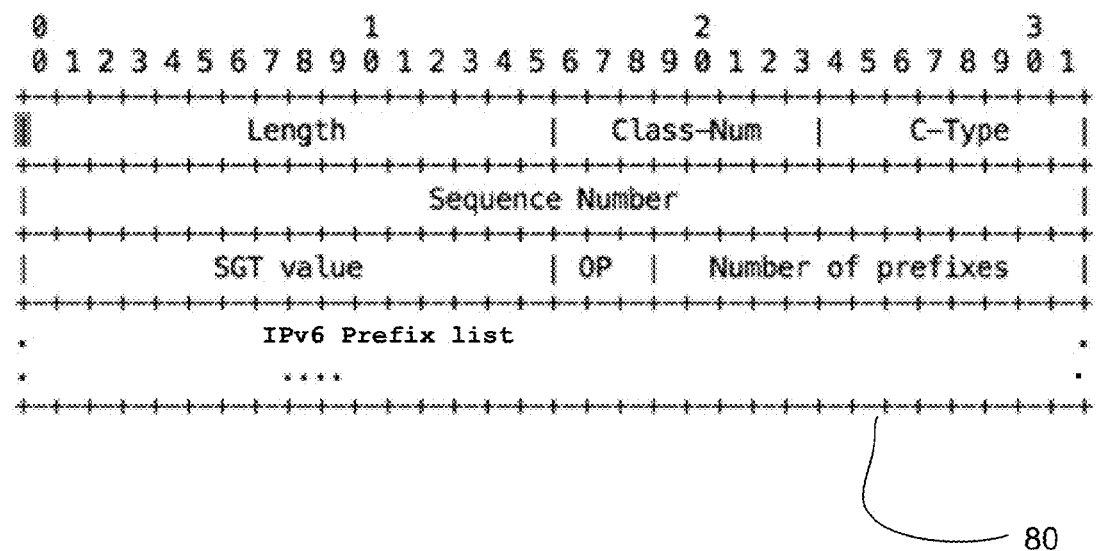
FIG. 8 illustrates an example of a prefix list to source group tag binding object for use in the source group tag propagation trace for IPv6, in accordance with one embodiment.

FIG. 8 illustrates an example of an IPv6 prefix list to SGT binding object 80. The Class-Num may be, for example, an IANA allocation from ICMP Trace-Ping extension registry. The C-Type may be 2. The Sequence Number may be a 32 bit number representing the binding for a specific list of IP addresses to SGT. The SGT value may be a 16 bit number. The OP may be 3 bits. Defined values include: 1—Filter Install; and 2—Filter Remove. The number of prefixes may be a 13 bit value corresponding to a total number of prefix lists. The IPv6 prefix list may contain a list of multiple of 17 octets data; where the first sixteen octets are the IPv6 prefix and the $17^{th}$ octet is the prefix length. The SGT value, OP, Number of prefixes, and Prefix list may be repeated multiple times to fit into a UDP packet not exceeding the MTU.

In one embodiment, the reply traceroute message 19 comprises an ICMP multi-part message packet format according to IETF RFC 4884, "Extending ICMP to Support Multi-Part Messages", R. Bonica et al., April 2007. The packet may include, for example, the following fields:

| IP | ICMP | Type 11 | Ext | Mapping Install Success |

Figure 9:
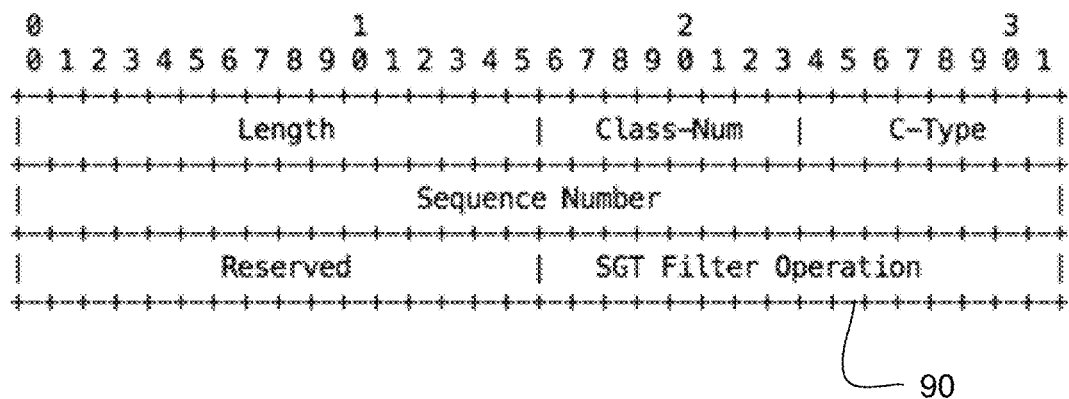
FIG. 9 illustrates an example of an extension object of a reply message for use in the source group tag propagation trace, in accordance with one embodiment.

As shown in FIG. 9, an ICMP extension object 90 may include an SGT filter operation field when sending back the ICMP Time Exceeded in response to the traceroute TTL expiring at the SGT-aware device. In one example, the Length is equal to 8 octets. The Class-Num may be an IANA allocation from ICMP Extension Object registry. The C-Type may be 1. The Sequence number may be 32 bits. This number represents the binding for a specific list of IP addresses to SGT. The SGT filter operation may be 16 bits, with defined values: 1—SGT Filter Installed Successfully; 2—SGT Filter Install Failed; 3—SGT Filter Removed Successfully; 4—SGT Filter Remove Failed; 5—SGT capable device, not SGT-aware boundary, Filter not installed.

It is to be understood that the packet formats shown in FIGS. 8 and 9 and described above are only examples and that different formats, fields, or values may be used without departing from the scope of the embodiments.

In certain embodiments, the traceroute operation may be non-global VRF (Virtual Routing and Forwarding) based. In this case, the same mechanisms that are used in the global routing demand may be applied.

The traceroute information may be used for troubleshooting. For example, the returned ICMP time exceeded packet may contain a status list for the nodes being traced. Each hop status may be, for example, normal (i.e., unaware of the extension), filter installed, filter not installed since the node is SGT-aware and not at the boundary, etc.

Certain embodiments may provide high availability (HA). The receiver or the binding filter installing nodes may synchronize the information to redundant modules to maintain the state. Upon receiving an acknowledgement from the remote nodes, the sender may register with routing protocols (e.g., IGP (Interior Gateway Protocol) or BGP (Border Gateway Protocol)) to detect if the remote node is reset.

As can be observed from the foregoing, one or more embodiments are particularly advantageous in that an entire network can be covered for SGT without static knowledge of non-SGT-aware islands. In certain embodiments, use of traceroute packets simplifies installation of SGT bindings with no need for static knowledge of the binding information or which nodes in the network the binding filters need to be installed. The traceroute mechanism may be used to identify where the SGT-aware islands start or stop.

Although the method and apparatus have been described in accordance with the embodiments shown, one of ordinary skill in the art will readily recognize that there could be variations made to the embodiments without departing from the scope of the invention. Accordingly, it is intended that all matter contained in the above description and shown in the accompanying drawings shall be interpreted as illustrative and not in a limiting sense.

What is claimed is:

1. A method comprising:
generating at a network device, a trace packet comprising an IP (Internet Protocol) to Source Group Tag (SGT) binding;
transmitting the trace packet from the network device to an SGT capable device, wherein at least one non-SGT capable device is interposed in a path between the network device and the SGT capable device; and
receiving at the network device, a reply packet from the SGT capable device in response to the trace packet, the reply packet indicating that said IP to SGT binding was installed at the SGT capable device.

2. The method of claim 1 wherein the trace packet comprises an IP prefix list to SGT binding object in a traceroute extension field.

3. The method of claim 1 wherein the reply packet comprises an ICMP (Internet Control Protocol Message) extension object containing an indication that said IP to SGT binding was successfully installed.

4. The method of claim 1 wherein the reply packet comprises an ICMP (Internet Control Message Protocol) multi-part message.

5. The method of claim 1 further comprising requesting said IP to SGT binding from a binding database.

6. The method of claim 1 wherein said IP to SGT binding is stored at a mapping table at the network device.

7. The method of claim 1 further comprising:
receiving an SGT tagged IP packet; and
identifying a next hop device as the non-SGT capable device;
wherein generating the trace packet comprises obtaining said IP to SGT binding from the SGT tagged IP packet.

8. The method of claim 1 wherein said IP to SGT binding comprises an IP address to SGT binding, an IP prefix to SGT binding, or an IP flow to SGT binding.

9. The method of claim 1 wherein installation of said IP to SGT binding at the SGT capable device comprises installation of an SGT binding filter.

10. A method comprising:
receiving a trace packet comprising an IP (Internet Protocol) to Source Group Tag (SGT) binding at an SGT capable device, the packet received from a non-SGT capable device interposed between a sender of the trace packet and the SGT capable device;
installing a filter based on said IP to SGT binding at the SGT capable device;
generating a reply packet in response to the trace packet, the reply packet indicating that said IP to SGT binding was installed at the SGT capable device; and
transmitting the reply packet to the sender.

11. The method of claim 10 wherein the trace packet comprises an IP prefix list to SGT binding object in a traceroute extension field.

12. The method of claim 10 wherein the reply packet comprises an ICMP (Internet Control Protocol Message) extension object containing an indication that the SGT filter was successfully installed.

13. The method of claim 10 wherein the reply packet comprises an ICMP (Internet Control Message Protocol) multi-part message.

14. The method of claim 10 wherein said IP to SGT binding comprises an IP address to SGT binding, an IP prefix to SGT binding, or an IP flow to SGT binding.

15. An apparatus comprising:
an interface for communication with a Source Group Tag (SGT) capable device via one or more non-SGT capable network devices;
a processor for generating a trace packet comprising an IP (Internet Protocol) to SGT binding, transmitting the trace packet to the SGT capable device, and processing a reply packet received from the SGT capable device in response to the trace packet, the reply packet indicating that said IP to SGT binding was installed at the SGT capable device; and memory for storing said IP to SGT binding.

16. The apparatus of claim 15 wherein the trace packet comprises an IP prefix list to SGT binding object in a traceroute extension field.

17. The apparatus of claim 15 wherein the reply packet comprises an ICMP (Internet Control Protocol Message) extension object containing an indication that said IP to SGT binding was successfully installed.

18. The apparatus of claim 15 wherein said IP to SGT binding is stored at a mapping table at the network device.

19. The apparatus of claim 15 wherein said IP to SGT binding comprises an IP address to SGT binding, an IP prefix to SGT binding, or an IP flow to SGT binding.

20. The apparatus of claim 15 wherein the processor is further operable to process an SGT tagged IP packet and identify a next hop device as a non-SGT capable device; wherein generating the trace packet comprises obtaining said IP to SGT binding from the SGT tagged IP packet.

21. An apparatus comprising logic encoded on one or more non-transitory computer readable media for execution and when executed by a processor operable to:
generate at a network device, a trace packet comprising an IP (Internet Protocol) to Source Group Tag (SGT) binding;
transmit the trace packet from the network device to an SGT capable device, wherein at least one non-SGT capable device is interposed in a path between the network device and the SGT capable device; and
process at the network device, a reply packet from the SGT capable device in response to the trace packet, the reply packet indicating that said IP to SGT binding was installed at the SGT capable device.

22. The apparatus of claim 21 wherein the trace packet comprises an IP prefix list to SGT binding object in a traceroute extension field.

23. The apparatus of claim 21 wherein the reply packet comprises an ICMP (Internet Control Protocol Message) extension object containing an indication that said IP to SGT binding was successfully installed.

* * * * *